United States Patent
Osawa et al.

(10) Patent No.: US 9,769,984 B2
(45) Date of Patent: *Sep. 26, 2017

(54) WORK APPARATUS WITH SAFETY EQUIPMENT

(75) Inventors: Hisato Osawa, Tokyo (JP); Kazuya Hanada, Tokyo (JP); Tadashi Ishimura, Saitama (JP); Shunsuke Nakadate, Tokyo (JP)

(73) Assignee: Yamabiko Corporation, Tokyo (JP)

(*) Notice: Subject to any disclaimer, the term of this patent is extended or adjusted under 35 U.S.C. 154(b) by 1488 days.

This patent is subject to a terminal disclaimer.

(21) Appl. No.: 12/783,886

(22) Filed: May 20, 2010

(65) Prior Publication Data

US 2010/0294616 A1 Nov. 25, 2010

(30) Foreign Application Priority Data

May 21, 2009 (JP) .................................. 2009-123599

(51) Int. Cl.
*A01D 34/82* (2006.01)
*A01D 75/20* (2006.01)
*F16P 3/00* (2006.01)

(52) U.S. Cl.
CPC ........... *A01D 34/828* (2013.01); *A01D 75/20* (2013.01); *A01D 75/206* (2013.01); *F16P 3/008* (2013.01); *Y10T 83/089* (2015.04)

(58) Field of Classification Search
CPC ...... A01D 34/828; A01D 75/18; A01D 75/20; A01D 75/206; F16P 3/008; Y10S 56/15; Y10T 83/081; Y10T 83/089; Y10T 83/175; Y10T 83/85

USPC ........ 30/276; 56/DIG. 15; 83/58, 62.1, 76.7, 83/522.12; 340/680; 700/159, 174, 177
See application file for complete search history.

(56) References Cited

U.S. PATENT DOCUMENTS

| | | | | |
|---|---|---|---|---|
| 2,748,810 A | * | 6/1956 | Strunk | .................... B27B 17/12 30/123.4 |
| 3,353,525 A | * | 11/1967 | Nutten et al. | ........... F02B 63/02 123/339.1 |
| 3,606,745 A | | 9/1971 | Girodat | |
| 3,923,126 A | * | 12/1975 | Bidanset | .................... 188/77 W |

(Continued)

FOREIGN PATENT DOCUMENTS

| | | |
|---|---|---|
| JP | 62-198320 | 9/1987 |
| JP | 02-131822 | 11/1990 |

(Continued)

OTHER PUBLICATIONS

Extended European Search Report issued in corresponding European Patent Application No. 10163544.9 dated Aug. 20, 2010 (3 pages).

(Continued)

*Primary Examiner* — Clark F Dexter
(74) *Attorney, Agent, or Firm* — Kilyk & Bowersox, P.L.L.C.

(57) ABSTRACT

An engine-driven brush cutter (100) equipped with a safety device (42) that includes an acceleration sensor unit (24) attached to a drive unit (4) in an aslant orientation such that a detection axis (DA) of the sensor unit (24) inclines by an angle ($\theta 1$) relative to the up-and-down direction (V) of the brush cutter (100). This inclined orientation of the detection axis (DA) contributes to lowering the sensitivity of the sensor unit (24) to engine vibration to which the safety device should not be sensitive so much.

4 Claims, 19 Drawing Sheets

(56) References Cited

U.S. PATENT DOCUMENTS

| | | | |
|---|---|---|---|
| 4,178,741 A | | 12/1979 | Lonn et al. |
| 4,553,326 A | * | 11/1985 | West .................... 30/381 |
| 4,793,064 A | * | 12/1988 | Nagashima ............. 30/382 |
| 6,111,515 A | * | 8/2000 | Schaer ............... B25F 5/00 340/679 |
| 6,213,066 B1 | * | 4/2001 | Dahlberg et al. ...... F02B 63/02 123/184.23 |
| 8,818,548 B2 | * | 8/2014 | Aoki et al. ......... A01D 34/828 340/680 |
| 2004/0181951 A1 | * | 9/2004 | Wittke ............... B27B 17/083 30/382 |
| 2006/0090351 A1 | | 5/2006 | Yoshida |
| 2008/0235958 A1 | * | 10/2008 | Yoshida ............... A01D 34/90 30/276 |
| 2010/0064532 A1 | * | 3/2010 | Wittke et al. ......... B27G 19/003 30/382 |
| 2010/0257743 A1 | * | 10/2010 | George ............... B27B 17/083 30/383 |
| 2010/0294097 A1 | * | 11/2010 | Aoki et al. ........... A01D 34/828 83/58 |
| 2010/0294098 A1 | * | 11/2010 | Nakadate et al. ..... A01D 34/828 83/62.1 |

FOREIGN PATENT DOCUMENTS

| | | |
|---|---|---|
| JP | 04-158714 | 6/1992 |
| JP | 08-187024 | 7/1996 |
| JP | 2006-288296 | 10/2006 |
| JP | 2008-118960 | 5/2008 |

OTHER PUBLICATIONS

Extended European Search Report issued in corresponding European Patent Application No. 10163546.4 dated Aug. 20, 2010 (3 pages).

U.S. Appl. No. 12/783,838, filed May 20, 2010.

U.S. Appl. No. 12/784,536, filed May 21, 2010.

\* cited by examiner

To external device

To external device

WORK APPARATUS WITH SAFETY EQUIPMENT

The present application claims priority from Japanese Patent Application No. 2009-123599, filed May 21, 2009, which is incorporated herein by reference.

FIELD OF THE INVENTION

The present invention generally relates to a small outdoor-use work apparatus equipped with a cutting tool, such as a brush cutter, chain saw, hedge trimmer, etc. The present invention more particularly relates to a work apparatus using an internal combustion engine as its drive source and equipped with a safety device for assuring the worker's safety in working with such a work apparatus.

BACKGROUND OF THE INVENTION

The above-mentioned hand-held compact work apparatuses using a compact internal combustion engine, which may typically be a single-cylinder engine, include brush cutters used in mowing, chain saws intended for use in logging or trimming, and hedge trimmers used in hedge trimming, all of which are well-known. These brush cutters, chain saws, etc. use a cutting blade that moves at a high speed. For this reason, there have been developed work apparatuses equipped with a safety device intended to protect the worker using the work apparatus from the cutting blade when any sudden danger arises during the work.

Japanese Utility Model Laid-open Publication No. H02 (1990)-131822 (hereafter referred to as "Patent Document 1" as well) discloses a shoulder-strap type brush cutter, i.e. a hand-held brush cutter. On each of right and left handles of the brush cutter, a stop lever is provided. The stop lever is actuated when grasped by the worker. When at least one of the right and left stop levers is released, fuel supply to the engine is forcibly stopped by closing a fuel valve mechanically linked to the stop lever, or supply of power to an ignition plug of the engine is forcibly interrupted.

Japanese Patent Laid-open Publication No. H04-(1992)-158714 (hereafter referred to as "Patent Document 2" as well) discloses a shoulder-strap type brush cutter in which a stop lever or pressure sensor is provided on a handle of the brush cutter to actuate an electromagnetic brake or mechanical stopper and thereby forcibly stop the rotation of the cutting blade when the worker unlinks off the handle.

Japanese Patent Laid-open Publication No. H08 (1996)-187024 (hereafter referred to as "Patent Document 3" as well) discloses a shoulder-strap type brush cutter, i.e. a hand-held brush cutter, having a centrifugal clutch interposed between a drive source and a power transmission shaft that mechanically connects a cutting blade to the drive source. The centrifugal clutch has a clutch shoe that mechanically operates by a large relative displacement, if any, between the drive source and the power transmission shaft to automatically brake the centrifugal clutch.

Japanese Patent Laid-open Publication No. 2008-118960 (hereafter referred to as "Patent Document 4" as well) discloses a shoulder-strap type brush cutter having a cap attached at an end of the shoulder strap such that the cap can be brought into engagement with a switch body on the part of the brush cutter. In this shoulder-strap type brush cutter, if the cap disengages from the switch body upon a kickback of the brush cutter that may occur when the cutting blade hits a large stone or rock, power supply to an ignition plug is forcibly interrupted, and the engine stops.

Japanese Patent Laid-open Publication No. 2006-288296 (hereafter referred to as "Patent Document 5" as well) discloses a hand-held type electric brush cutter having a shock sensor. The shock sensor includes a piezoelectric element that abuts a circumferential part of a manipulation tube provided around a power transmission shaft connecting an electric motor as a drive source to a cutting blade. When the shock sensor detects a shock larger than a predetermined level, the motor is forcibly stopped. More specifically, a box surrounding the manipulation tube is provided near a handle fixed at a lengthwise central portion of the manipulation tube, and the shock sensor is affixed to the box in abutment with the manipulation tube. In this Patent Document 5, it is also proposed to provide, in the safety device including the shock sensor, a variable resistor for adjusting a current flowing through the shock sensor (piezoelectric element) to eliminate the variation in sensitivity from one piezoelectric element to another.

Problems to be Solved by the Invention

Among the conventional safety devices of the aforementioned types, those ones disclosed in Patent Documents 1 and 2, for example, are designed to act only when the worker using the brush cutter takes the hand off the stop lever or pressure sensor on the handle of the machine. The worker must always bear in mind the conditions under which the safety device is actuated. However, if the worker falls down off balance during working with the work apparatus, all his attention will be directed to regaining his footing, and will fail to unlink the hands from the handle. Otherwise, the worker might have got in a situation incapable of pulling back his hand away from the handle. Since brush cutters, chain saws, and the like, are power-driven, cutter-equipped work apparatuses, workers may be driven into other dangerous conditions as well. Therefore, the safety device should be automatically actuated whenever necessary, not depending upon the operation by the worker.

The safety device taught by Patent Document 5, which uses piezoelectric element as the shock sensor, does not rely on operator's manipulation. In this safety device, however, a box is provided at a handle portion of the manipulation tube (main tube) surrounding the power transmission shaft for transmitting the power from the drive source to the cutting blade such that the piezoelectric element (sensor) on the box detects displacement of the axis of the manipulation tube. That is, this safety device detects a contact pressure between the piezoelectric element and the manipulation tube. Therefore, to ensure accurate receipt of an input from the manipulation tube, the box supporting the piezoelectric element must have a considerable rigidity. In addition, sensitivity of the piezoelectric element depends on where of the manipulation tube in its circumferential direction the piezoelectric element is located. For example, if the piezoelectric element should be responsive to up-and-down vibration of the manipulation tube, it need be placed on the top or bottom surface of the manipulation tube. If it should be responsive to right-and-left vibration, it must be placed on the left or right surface of the manipulation tube.

Therefore, due to the use of the contact type shock sensor, the safety device of Patent Document 5 must have a strong design for the box for supporting the sensor, and this causes an increase of the weight of the work apparatus. Furthermore, such a contact type shock sensor involves a difficulty in determining where of the circumferential position of the manipulation tube it should be located.

As an alternative mechanism usable in place of the piezoelectric type shock sensor referred to above, it would be possible to employ a mechanical shock detection switch. Japanese Patent Laid-open Publication No. 2006-172984 discloses a fall detecting switch for use in a portable computer to prevent damage of its hard disk when the computer drops. This switch is a combination of a plummet provided at a free end of a cantilever coil spring and a cylinder that accommodates the plummet.

Japanese Patent Laid-open Publication No. S48 (1973)-45873 discloses a mechanical shock detection switch for activating an automobile air bag mechanism. This is an inertial switch as a sensor for an air bag. This inertial switch includes a plummet supported in a case by a tensile spring and a ring housing the plummet to output an ON signal for deflating an air bag when the plummet swings with a shock and contacts the ring.

Japanese Patent Laid-open Publication No. H11(1999)-2642 teaches a structure in which a fixed lead and a movable lead are contained in a sealed case and a plummet is attached at an end of the movable lead. When the plummet moves in its detection direction into contact with an end of the fixed lead upon application of a shock, an ON signal is outputted to inflate an air bag.

Japanese Patent Laid-open Publication No. 2002-311047 discloses an acceleration detection switch as a sensor for activating an air bag. This acceleration detection switch has a plummet supported by a spring. When the plummet moves in its detecting direction, he switch turns ON.

Japanese Patent Laid-open Publication No. 2003-90846 discloses an acceleration detection switch as a sensor for an air bag. This switch has a slidable shaft extending through a through hole of a mass body. When the mass body moves by a given amount with a shock, the switch turns ON.

Japanese Utility Model Registration Publication No. 3012477 uses a switch having a movable contact tensely pulled down by a spring. When the movable contact swings into contact with a fixed contact, the switch turns ON.

Not limited to the above examples, there are many proposals of shock detection switches. It would be possible to use one of such mechanical shock detection switches to form a safety device of a work apparatus having a cutting blade. In this case, however, since the shock detection switch itself already includes some components, the safety device will inevitably become complex in structure due to an increased number of components. Additionally, especially in a work apparatus using an engine, if such a safety device is located near the engine, a new problem of malfunction or durability arises due to engine vibration.

In view of these problems, the Inventors made researches with the intention of employing a shock detecting means that is relatively simple but can reliably detect that a worker has been exposed to danger. More specifically, from the standpoint of enhancing the accuracy of a safety device in function for protecting a worker from a cutting blade when any sudden danger arises, the Inventors made detailed reviews regarding when and how workers are most possibly exposed to danger while they are cutting grass or shrubs with a brush cutter that is a typical work apparatus.

A first possible situation is that, when a cutting blade hits a rock, stump or the like, the brush cutter has been kicked back and the worker can no longer control the brush cutter. In this case, it is highly possible that the worker is exposed to danger. A second possible situation is that the worker fell down while at work. In this case, as well, it is highly possible that the worker is exposed to danger. A third possible situation is that, sniffing a danger, the worker threw the brush cutter or unlinked hands from the handle. In this case, as well, it is highly possible that the worker is exposed to danger. These discussions are also applicable to chain saws and hedge trimmers. Therefore, it is desirable for the safety device of a work apparatus equipped with a cutting blade to reliably operate when any of those three situations is actually present. It is of course desirable that the safety device does not rely on operator's manipulation.

On the other hand, once the safety mechanism reliably operates and keeps the worker safe, this means that nothing occurred to the worker himself. Usually, therefore, the worker will want to resume and continue his work immediately. Therefore, the safety device must satisfy this worker's request.

Let reference be made again to the three situations very likely to expose the worker to danger, that is, (1) the situation where the machine is no longer controllable due to the kickback; (2) the situation where the worker fell down or is off balance; and (3) the situation where the machine dropped down to the ground. One of features common to all of these situations is a momentary large impulse and a large posture change of the work apparatus. One choice for detecting such a momentary impulse or a change in posture is the use of an acceleration sensor of a non-contact type. A non-contact sensor allows a wider choice for its mounting position and does not require a rigid box unlike a contact type sensor.

However, in relation to work apparatuses equipped with a cutting blade, no safety devices employing an acceleration sensor as a shock sensor have heretofore appeared and even a proposal of such devices has been found. Its potential reason is that such a work apparatus is subjected to various kinds of vibration. Especially, in a work apparatus using an internal combustion engine and locating the acceleration sensor near the engine, it is difficult to determine a threshold for distinction of shocks under conditions likely to expose the worker to danger from normal engine vibration.

Nevertheless, locating the acceleration sensor near the engine has various advantages. Examples of these advantages are as follows.

(1) In case of a brush cutter, since a long-sized power transmission shaft is interposed between the cutting blade, which receives an impulse, and the drive unit, the impulse moment acting upon the acceleration sensor located near the engine can be maximized.

(2) Since the engine is a relatively heavy load, the impulse at the drive unit is relatively large when the work apparatus drops to the ground.

(3) In case the acceleration sensor is located near the engine, since a microcomputer or other control means is also located near the engine, wiring for connecting the acceleration sensor to the control means may be short.

Here again, however, the problem should be remarked regarding the difficulty in distinction of situations likely to expose the worker to danger from engine vibration that directly enters into the acceleration sensor located near the engine of the work apparatus.

In view of these problems, the Inventors prepared a trial hand-held brush cutter using an internal combustion engine (single-cylinder, two-stroke engine), in which an acceleration sensor is located near the drive unit, i.e. the engine. With this brush cutter, the Inventors measured vibration detected by the acceleration sensor. Results of the measurement are shown in FIGS. 1 through 3. These data were taken with the brush cutter locating the acceleration sensor (for single-axis detection) on an engine cover of the engine by increasing the engine revolution while driving the work apparatus in the same manner as in its brush-cutting operation, that is, while moving the cutting blade right and left with a hand gripping the handle. Therefore, the measured data shown in FIGS. 1 to 3 are not those taken during actual brush-cutting operation. The brush cutter used in the measurement is of a hand-held type with a single-cylinder engine borne on the brush cutter in a posture with the axis of its cylinder bore extending vertically.

FIG. 1 shows vibration detected by the acceleration sensor fixed to the engine cover in an orientation for the detection axis to extend in the up-and-down direction. In other words, FIG. 1 shows data of up-and-down vibration. FIG. 2 shows vibration detected by the acceleration sensor fixed to the engine cover in an orientation for the detection axis to extend in the front-and-rear direction. In other words, FIG. 2 shows data of front-and-rear vibration. FIG. 3 shows vibration detected by the acceleration sensor affixed to the engine cover in an orientation for the detection axis to extend in the right-and-left direction. In other words, FIG. 3 shows data of right-and-left vibration. In FIGS. 1 to 3, dash-and-dot lines indicate data measured at the engine speed of 8,500 rpm whereas solid lines indicate data measured at the engine speed of 10,000 rpm.

The terms "up-and-down direction", "front-and-rear direction" and "right-and-left direction" used herein are explained below. The term "up-and-down direction" means an up-and-down direction when the brush cutter is placed in its normal posture along the axial direction of the cylinder bore of the engine, that is, on a horizontal mount. The term "front-and-rear direction" means that as viewed from the worker who operates the brush cutter. It may be roughly paraphrased as the lengthwise direction of the manipulation tube (power transmission shaft that transmits the power of the engine to the cutting blade) of the brush cutter. The term "right-and-left direction" means the direction in which the cutting blade is moved during a brush cutting operation. In other words, it is a lateral direction as viewed from the worker.

In brush cutting, the engine is driven at the speed of 8,000 to 10,000 rpm. With reference to FIG. 1 showing measured data of up-and-down vibration, a relatively large acceleration is observed in the normal revolution range. This up-and-down vibration can be regarded as engine vibration substantially. Therefore, in a brush-cutter with an internal combustion engine and an acceleration sensor in the drive unit, it is difficult to distinguish an inherent acceleration derived from engine vibration from an acceleration detected by the acceleration sensor upon occurrence of a condition likely to invite a danger. It is therefore understood that setting of a threshold for activating the safety device is impossible in reality.

If a relatively low threshold is determined to put more importance to safety, the safety device will be excessively sensitive to acceleration resulting from inherent vibration of the work apparatus including the engine and will result in executing forcible interruption of the cutting of work. Of course, this is a decrease of the workability of the work apparatus. Therefore, users will refrain from purchasing work apparatuses having an excessively sensitive safety apparatus even though they are excellent in terms of safety.

FIGS. 4-6 show data of vibration in a chain saw using an internal combustion engine as its drive source, which were measured near the engine. Here again, an acceleration sensor of a single axis type is located near the engine of the chain saw, and vibration was measured as detection output values of the acceleration sensor.

The "up-and-down direction", "front-and-rear direction" and "right-and-left direction" indicated in FIGS. 4 through 6 are basically the same as those of the brush cutter. That is, the "up-and-down direction" means a vertical direction when the chain saw is placed in its normal posture along the axial direction of the cylinder bore of the engine, that is, on a horizontal mount. The "front-and-rear direction" means that as viewed from the worker who operates the chain saw. The "right-and-left direction" means a lateral direction as viewed from the worker who operates the chain saw.

The engine revolution of the chain saw in operation is 8,000 to 10,000 rpm. With reference to FIG. 4 showing measured data of up-and-down vibration, a relatively large acceleration is observed in the normal revolution range. This up-and-down vibration can be regarded as engine vibration substantially.

FIGS. 7 to 9 show data of vibration in a hedge trimmer using an internal combustion engine, which was measured near the engine. Here again, an acceleration sensor of a single axis type is located near the engine of the hedge trimmer, and vibration was measured as detection output values of the acceleration sensor.

The "up-and-down direction", "front-and-rear direction" and "right-and-left direction" indicated in FIGS. 7 through 9 are basically the same as those of the brush cutter or chain saw. That is, the "up-and-down direction" means a vertical direction when the hedge trimmer is placed in its normal posture along the axial direction of the cylinder bore of the engine, that is, on a horizontal mount. The "front-and-rear direction" means that as viewed from the worker who operates the hedge trimmer. The "right-and-left direction" means a lateral direction as viewed from the worker who operates the hedge trimmer. The hedge trimmer has the engine mounted to lie with the axis of its cylinder bore extending in the front-to-rear direction. Therefore, in case of the hedge trimmer, the front-and-rear vibration includes engine vibration.

The engine revolution of the hedge trimmer in operation is 8,000 to 10,000 rpm. With reference to FIG. 8 showing measured data of front-and-rear vibration containing engine vibration, a relatively large acceleration is observed in the normal revolution range. This front-to-rear vibration can be regarded as engine vibration substantially.

It is an object of the invention to provide a work apparatus equipped with a safety device capable of reliably detecting situations likely to invite a danger while diminishing influence of engine vibration even with an acceleration sensor located in a drive unit of the work apparatus having an internal combustion engine as the drive source.

SUMMARY OF THE INVENTION

To accomplish the above technical object, there is provided a work apparatus including an internal combustion engine in a drive unit and equipped with a safety device for protecting a worker from a cutting blade upon occurrence of an accidental condition while the worker works with the cutting blade driven at a high speed by a drive force transmitted from the internal combustion engine, comprising:

an acceleration sensor attached in said drive unit; and a controller supplied with an output from said acceleration sensor to output a safety signal for activating the safety device when the acceleration detected by the acceleration sensor is higher than a threshold, wherein said acceleration sensor is assembled in said drive unit in such an orientation that a detection axis thereof inclines from an axial direction of a cylinder bore of said internal combustion engine.

In work apparatuses using an engine, the engine is assembled typically in an orientation with the axis of its cylinder bore extending vertically. Taking such a typical work apparatus (brush cutter or a chain saw) as an example for explanation, the acceleration sensor assembled in the drive unit is oriented to have its detection axis inclined from the up-and-down direction. The inclined acceleration sensor is less sensitive to up-and-down vibration, which is engine vibration in the drive unit, than the intrinsic sensitivity the acceleration sensor originally has. Degree of the decrease in sensitivity can be determined by changing the angle of inclination of the detection axis. In hedge trimmers, in general, the engine is typically laid to have the axis of the cylinder bore extended in the front-to-rear direction. In case of such a work apparatus with an engine assembled to rest in a flat position, the acceleration sensor may be assembled for its detection axis to incline from the axis of the cylinder bore. This is applicable to two-axis type sensors and three-axis type sensors as well. When, for example, an acceleration having two detection axes is used, one of these two axes may be inclined from the up-and-down direction, and the suppression degree of the sensitivity to vibration in the drive unit, which is vibration of the engine, can be adjusted by changing the angle of inclination of that detection axis. In this manner, influence of engine vibration can be reduced. Accordingly, a relatively small value can be set as the threshold for activating the safety device.

Even though the detection axis of the acceleration sensor inclines from the up-and-down direction, when the work apparatus drops down to the ground due to a kickback from a hard mass or falling of the worker, the impact generated thereby is large, and the acceleration detected by the acceleration sensor is large as well. When the worker becomes unresistable against the kickback and unable to control the work apparatus any more, the posture of the work apparatus will change largely and suddenly, and the orientation of the detection axis of the acceleration sensor mounted in the drive unit will change as well. When also the work apparatus drops to the ground, the same situation will arise, and the work apparatus will change its posture due to the dropping. Therefore, it is highly possible for the acceleration sensor to detect the impulse with the sensitivity it originally has.

According to the present invention, even though a relatively low threshold value is preset, it results in substantially the same as using a high threshold as far as the engine vibration is concerned because the sensitivity to the engine vibration is lowered by inclining the acceleration sensor from the axial direction of the cylinder bore. Therefore, even with a low threshold, it is possible to prevent the safety device from excessively sensitive activation in response to the engine vibration while reliably activating it when the work apparatus drops to the ground due to falling of the worker or upon a kickback the worker cannot withstand. In addition, since activation of the safety device according to the invention depends on the acceleration sensor instead of manipulation of a worker, the worker can continue or resume his/her work unconsciously of activation of the safety device.

The level of suppression of the sensitivity to the engine vibration by the acceleration sensor mounted aslant in the drive unit may be determined by experimentally reviewing the characteristics of the work apparatus and adjusting the angle of inclination for mounting the acceleration sensor, that is, the angle of inclination of the detection axis with respect to the axial direction of the cylinder bore. Since the required degree of safety depends on the environment where the work apparatus is used, its desirable to enable each user himself to adjust the angle of inclination of the acceleration sensor.

In a preferred embodiment of the present invention, the work apparatus includes an acceleration sensor unit comprising the acceleration sensor explained above; a shock signal generating means constituting a part of the above-explained controller to generate a shock detection signal when the acceleration sensor detects an acceleration higher than the threshold; and a timer means for holding the maximum acceleration of a momentary shock detected by the acceleration sensor for a given time (for example, 5 seconds) to continue an output of the shock detection signal for a given time when the maximum acceleration exceeds the predetermined threshold. When the acceleration sensor unit is mounted in the drive unit of the work apparatus to be aslant from the axial direction of the cylinder bore, the detection axis of the acceleration sensor in the unit is inclined as well from the up-and-down direction that is the axial direction of the cylinder bore. Sensor units of this type are commercially available as a commodity. Therefore, such a commercially available sensor unit may be used to make up the safety device of the work apparatus, which will contribute to cost reduction. Additionally, since the shock detection signal is held on for the given time, it is possible to reliably start the operation of the safety device.

Commercially available acceleration sensor units of this type include a lineup of different versions of various sensitivities, and some acceleration sensor units different in sensitivity may be offered to each user such that the user can select one having a favorable level safety in accordance his/her working environment. Thus, a work apparatus equipped with the safety device in compliance with the user's working environment can be delivered to him/her. The present invention is suitable for application not only to brush cutters using an internal combustion engine as the drive source, but also to other work apparatuses such as chain saws, hedge trimmers, etc. having a cutting blade.

DETAILED DESCRIPTION OF THE INVENTION

Preferred embodiments of the present invention will be explained below with reference to the accompanying drawings.

Figure 10:
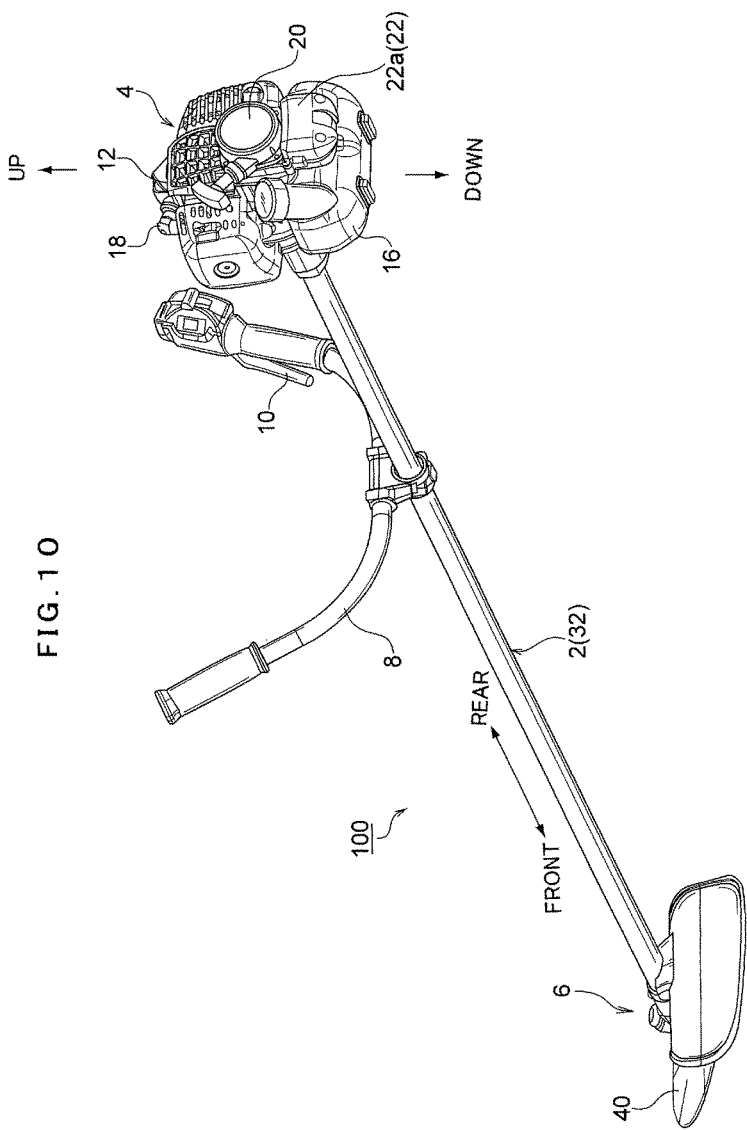
FIG. 10 is a perspective view of a shoulder-strap type brush cutter according to an embodiment of the present invention.
Figure 11:
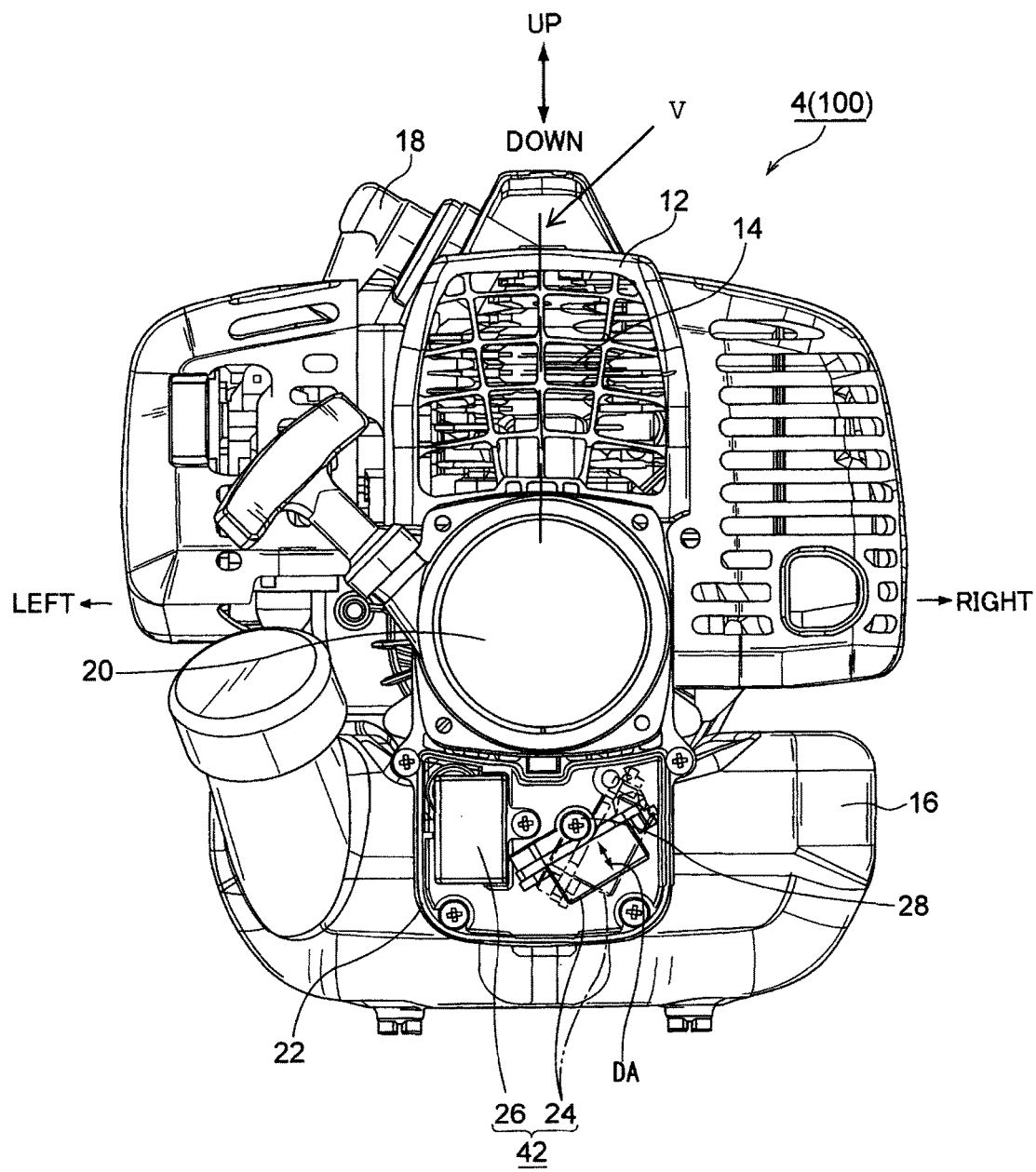
FIG. 11 is a rear view of a drive source of the brush cutter of FIG. 10.

FIGS. 10 and 11 show a shoulder-strap type brush cutter, i.e. a hand-held brush cutter, according to an embodiment of the present invention. With reference to FIG. 10 that is a perspective view of the brush cutter, the brush cutter 100 includes a manipulation tube 2, a drive unit 4 located at one end of the manipulation tube 2, and a cutter unit 6 located at the other end of the manipulation tube 2. The manipulation tube 2 has a handle 8 attached to its lengthwise middle portion. The above construction is well known. The handle 8 has a throttle lever 10 etc. provided thereon. By operating the throttle lever 10, the worker can adjust the operation speed of the cutter unit 6.

The drive unit 4 includes an air-cooled single-cylinder two-stroke internal combustion engine 14 (FIG. 11) covered with an engine cover 12. The single-cylinder engine 14 is mounted such that the axial line of the cylinder bore extends vertically, namely, in the up-and-down direction. That is, this single-cylinder two-stroke engine 14 is a vertically mounted engine. The drive unit 4 further includes a fuel tank 16 disposed adjacent to and under the engine 14. The engine 14 runs using the fuel supplied from the fuel tank 16. In FIGS. 10 and 11, reference numeral 18 indicates an ignition plug. The ignition plug 18 is affixed to the top of the engine 14.

Reference numeral 20 indicates a recoil starter. The recoil starter 20 is mounted on the back of the drive unit 4 to project rearward. By operation of the recoil starter 20, the engine 14 can be started. A shock detection box 22 is disposed in a dead space under the recoil starter 20 at the back of the fuel tank 16.

FIG. 11 is a view of the brush cutter 100 taken from its rear end direction, namely, from the side opposite from the cutter unit 6. In FIG. 11, the shock detection box 22 is shown with its cover 22a removed. The shock detection box 22 has provided therein a safety device 42, the safety device including an acceleration sensor unit 24 and a controller 26, the controller 26 comprising a microcomputer.

The acceleration sensor unit 24 includes a piezoelectric sensor. The piezoelectric sensor has a pickup made of a piezoelectric ceramic bonded on a thin disk-shaped metallic sheet. The pickup has a single detection axis. Sensor units of this sort are commercially available. Among those, this embodiment uses a sensor unit identified by model number GLD or SDS, both manufactured and marketed by SEN-SATEC Co., Ltd. (Head Office: Namikawa, Oimachi, Kameoka-shi, Kyoto, Japan). This acceleration sensor unit 24 exhibits stable output characteristics in the frequency range of 1 kHz and below. The acceleration sensor unit 24 is one of some versions available, which are different in sensitivity. Alternatively, instead of using such a commercially available acceleration sensor unit 24, an acceleration sensor, such as a semiconductor sensor, may be used in the brush cutter 100. A typical example of semiconductor sensor is a piezoelectric element sensor. Well-known semiconductor sensors include a uniaxial type having a single detection axis, biaxial type having two axes of detection, and a triaxial type having three axes of detection. According to this embodiment, any one of these uniaxial, biaxial and triaxial types may be used as the acceleration sensor. However, the uniaxial-axial type acceleration sensor has the advantage of simplifying processing by the controller 26.

The commercially available acceleration sensor unit 24 includes a multi-vibrator circuit that keeps the maximum acceleration of a detected shock for a given time (for example 5 seconds) and, if the maximum acceleration exceeds a predetermined threshold, continues outputting a shock detection signal for a predetermined duration. In other words, this acceleration sensor unit 24 not only detects the acceleration but also performs a part of the function of the controller 26. That is, it functions as a timer for keeping the maximum acceleration of a momentary shock for a predetermined time and, if the maximum acceleration exceeds the threshold, for continuously outputting a shock detection signal for a predetermined time (for example, five seconds). In case the safety device is made up of a combination of a solo acceleration sensor with the controller 26 instead of the acceleration sensor unit 24, it is recommended to incorporate the timer function in the controller 26.

Figure 12:
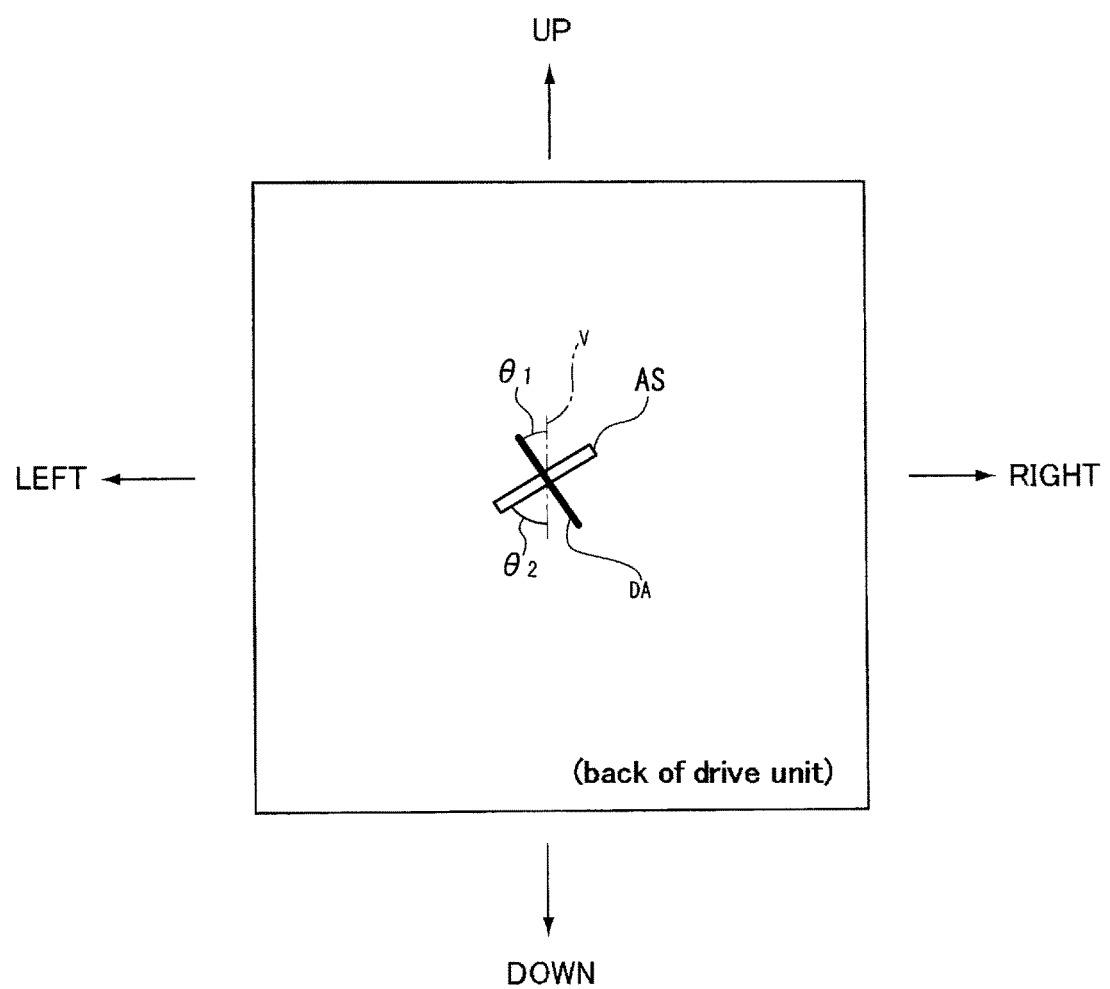
FIG. 12 is a diagram for explaining the detection axis of a single-axis acceleration sensor attached to the back face of the drive unit of the brush cutter inclines from the up-and-down direction.

The single detection axis of the acceleration sensor AS contained in the acceleration sensor unit 24 is shown by an arrow DA in FIG. 11. FIG. 12 depicts how the detection axis DA of the acceleration sensor unit 24 attached to the back of the drive unit 4 is inclined when the brush cutter 100 is seated on a horizontal plane.

It will be readily understood from FIG. 11 that, when the brush cutter 100 is seated on the horizontal plane, the acceleration sensor unit 24 is aslant relative to an up-and-down direction V, and the detection axis DA is aslant as well from the up-and-down direction V that is the axial direction of the cylinder bore as shown ion FIG. 12 as well. Reference symbol θ1 in FIG. 12 indicates the angle of inclination of the detection axis DA from the up-and-down direction V in the vertical plane. Reference "AS" used in FIG. 12 denotes the acceleration sensor (piezoelectric sensor) contained in the acceleration sensor unit 24 of FIG. 11.

When the acceleration sensor unit 24 is mounted on the drive unit 4 aslant of the up-and-down direction V, the shock pickup face of the acceleration sensor AS in the acceleration sensor unit 24 is disposed aslant of the up-and-down direction. In FIG. 12, the inclination angle at which the shock pickup face of the acceleration sensor AS is oriented aslant from the up-and-down direction is shown by reference symbol 82.

Figure 13:
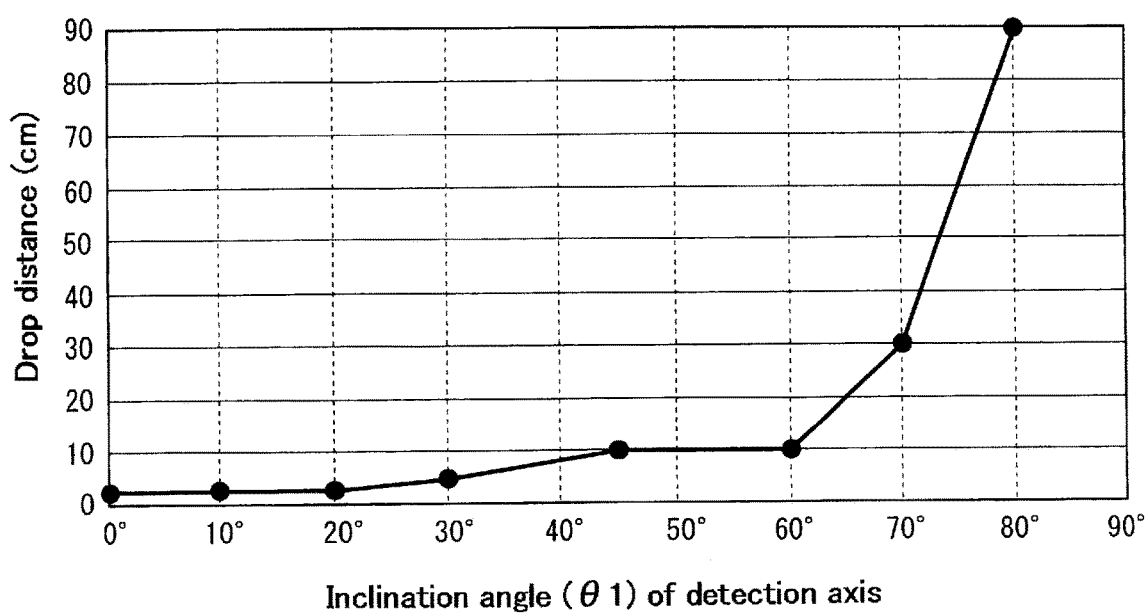
FIG. 13 shows data obtained by measuring the angle of inclination of the detection axis and the sensitivity of the acceleration sensor.

FIG. 13 shows relation between the inclination angle $\theta 1$ of the detection axis DA of the acceleration sensor unit 24 and sensitivity of the acceleration sensor unit 24. Data of FIG. 13 was obtained by measuring vertical drop distances of the brush cutter 100 dropping to the ground and monitoring responsive outputs of a predetermined value from the acceleration unit 24. In other words, the data of FIG. 13 shows to which value of height the acceleration sensor unit 24 was responsive and outputted a shock detection signal in the test of having the brush cutter 100 free-fall from various heights to the ground.

With reference to FIG. 13, let it be further considered to change the mounting angle of the acceleration sensor unit 24 to thereby change the inclination angle $\theta 1$ of the detection axis DA from the dropping direction, i.e. the right-and-left direction, of the brush cutter 100. If the inclination angle $\theta 1$ of the detection axis DA is 45 deg. for example, the acceleration sensor unit 24 issues a shock detection signal when the brush cutter 100 is left freely dropping from the height of about 10 cm. In case the inclination angle $\theta 1$ is 70 deg., the acceleration sensor unit 24 issues a shock detection signal when the brush cutter 100 freely drops from the height of about 30 cm. In case the inclination angle $\theta 1$ is 80 deg., the acceleration sensor unit 24 issues a shock detection signal when the brush cutter 100 freely drops from the height of about 90 cm. It will be understood from FIG. 13 that the larger the inclination angle $\theta 1$ of the detection axis DA, the lower becomes the sensitivity of the acceleration sensor unit 24.

Referring back to FIG. 11 again, the mounting orientation of the acceleration sensor unit 24 can be adjusted, by loosening a screw 28, to have any desired angle of inclination in a range from a first inclined position indicated with a solid line to a second inclined position indicated with an imaginary line. Thus, the inclination angle $\theta 1$ of the detection axis DA relative to the up-and-down direction can be changed. Of course, the acceleration sensor unit 24 can be fixed in an inclined position by tightening the screw 28. The illustrated example is designed to allow the user of the brush cutter 100 to select one of the two different inclined positions, namely, the first inclined position indicated with the solid line and second inclined position indicated with the imaginary line, in FIG. 11 by turning the acceleration sensor unit 24 about the screw 28. However, the brush cutter 100 may be arranged such that the user can select one of three or more inclined positions. The brush cutter 100 may also be designed to have the inclination angle $\theta 2$ of the pickup surface of the acceleration sensor unit 24 be fixed at any desired angle between the first and second inclined positions in a continuously variable manner.

Figure 14:
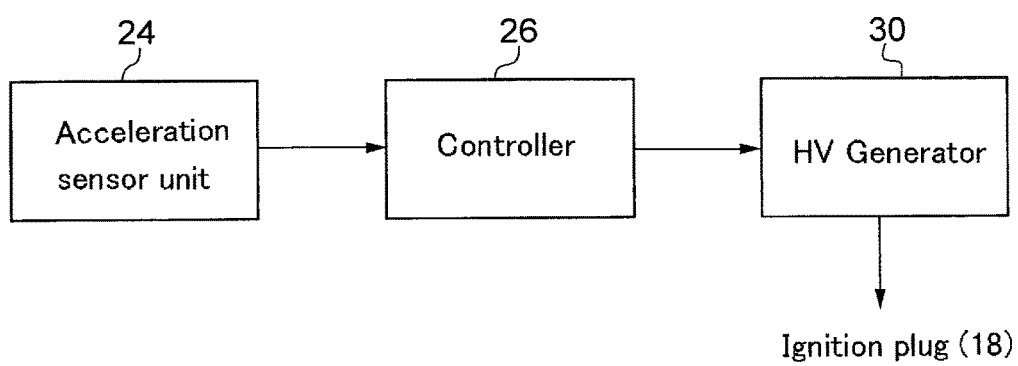
FIG. 14 is a block diagram of a safety device using a commercially available acceleration sensor unit and an object to be controlled by the safety device.

Once the acceleration sensor unit 24 detects an acceleration reaching the predetermine value (threshold value), it continuously supplies the shock detection signal to the controller for a predetermined time (for example, 5 seconds) after detection of this acceleration as already explained. As shown in FIG. 14, in receipt of the shock detection signal from the acceleration sensor unit 24, the controller 26 supplies a safety signal to a high voltage generating circuit 30 used to supply a high voltage to the ignition plug 18, and continues this supply of the signal for a predetermined time. As a result, the high voltage generating circuit 30 is inactivated and cannot generate the high voltage for a predetermined time (for example 5 seconds). Because of the interruption of the high voltage to the ignition plug 18, the engine 14 stops. Thereafter, however, if the supply of the high voltage to the ignition plug is immediately resumed, it may possibly occur that the engine 14 restarts due to an inertial force. Therefore, as the length of time for removing the possibility of restarting the engine, the time of 5 minutes, for example, is required. Of course, a longer time may be set by a timer as the waiting time. The safety control explained above stops power supply to the primary coil of the high voltage generator immediately upon receipt of the shock detection signal from the acceleration sensor unit 24. Continuation of the power interruption for the predetermined time ensures the engine to stop completely. Then, it results in stopping the function of the cutting blade 6 and stopping rotation of the cutting blade.

Figure 15:
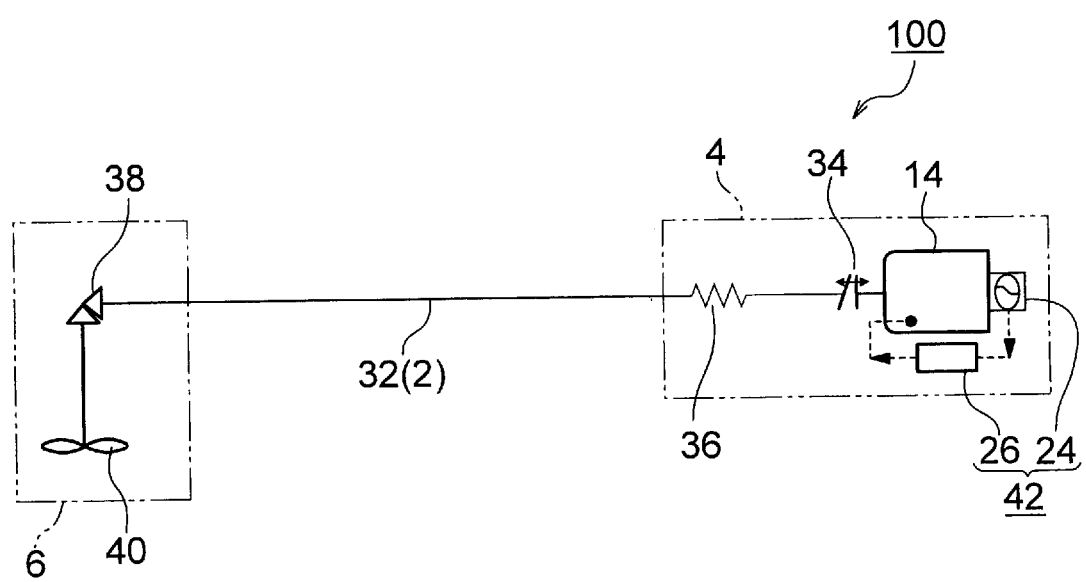
FIG. 15 shows a basic construction of the brush cutter in FIG. 10.

FIG. 15 shows a basic construction of the brush cutter 100 explained above. The engine 14 provided in the drive unit 4 supplies its output to the cutter unit 6 through a power transmission shaft 32 interposed in the manipulation tube 2. The drive unit 4 has a centrifugal clutch 34 and a damper 36 both interposed between the engine 14 and power transmission shaft 32. Further, a bevel gear 38 is provided in the cutter unit 6 to couple the power transmission shaft 32 and disk-shaped cutting blade 40 to each other.

As explained heretofore, in the brush cutter 100 according to the embodiment, the safety device 42 comprising the acceleration sensor unit 24 and the controller 26 immediately stops the supply of the high voltage to the ignition plug 18 and thereby stops the engine 14 when the acceleration sensor unit 24 detects an acceleration equal to or higher than a predetermined value. Since the output of the acceleration sensor unit 24 is maintained for a predetermined time (for example, 5 seconds), the engine 14 can be stopped reliably. In other words, if the safety signal outputted from the controller 26 ends in a relatively short time, the engine 14 will undesirably restart with the inertial force remaining in the engine 14 immediately after the safety signal if turns OFF. The present invention reliably prevents such an undesirable, accidental movements of the brush cutter 100.

Figure 1:
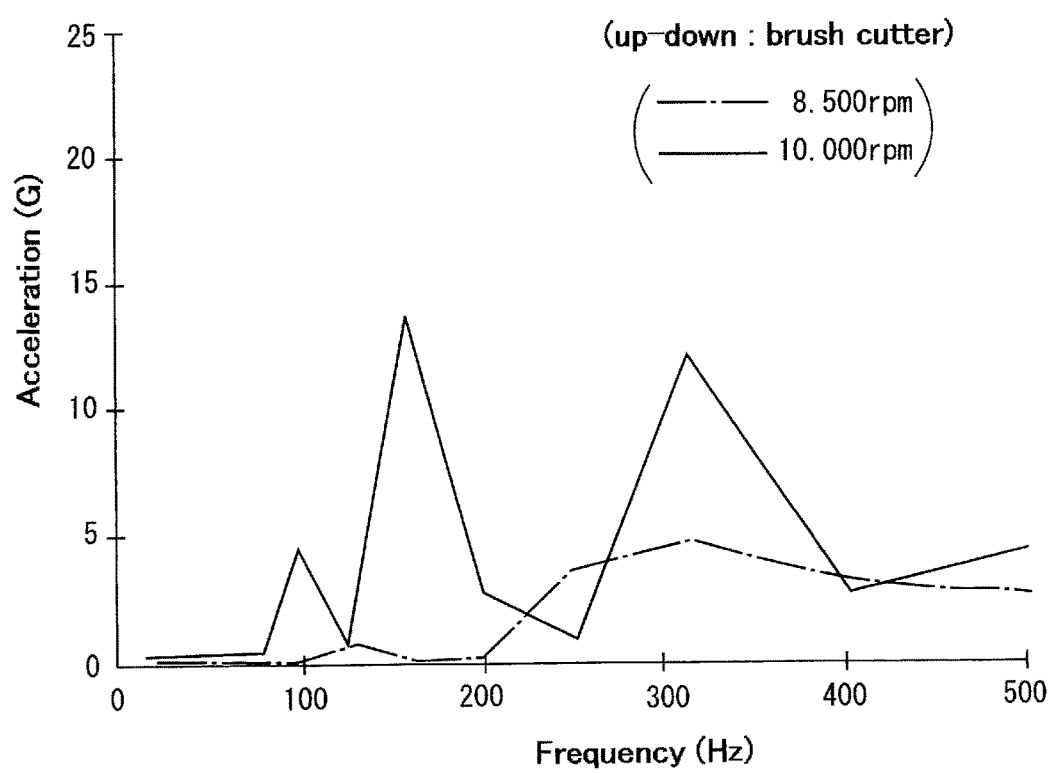
FIG. 1 shows data of up-and-down vibration detected on a drive unit of a brush cutter driven by an internal combustion engine.
Figure 2:
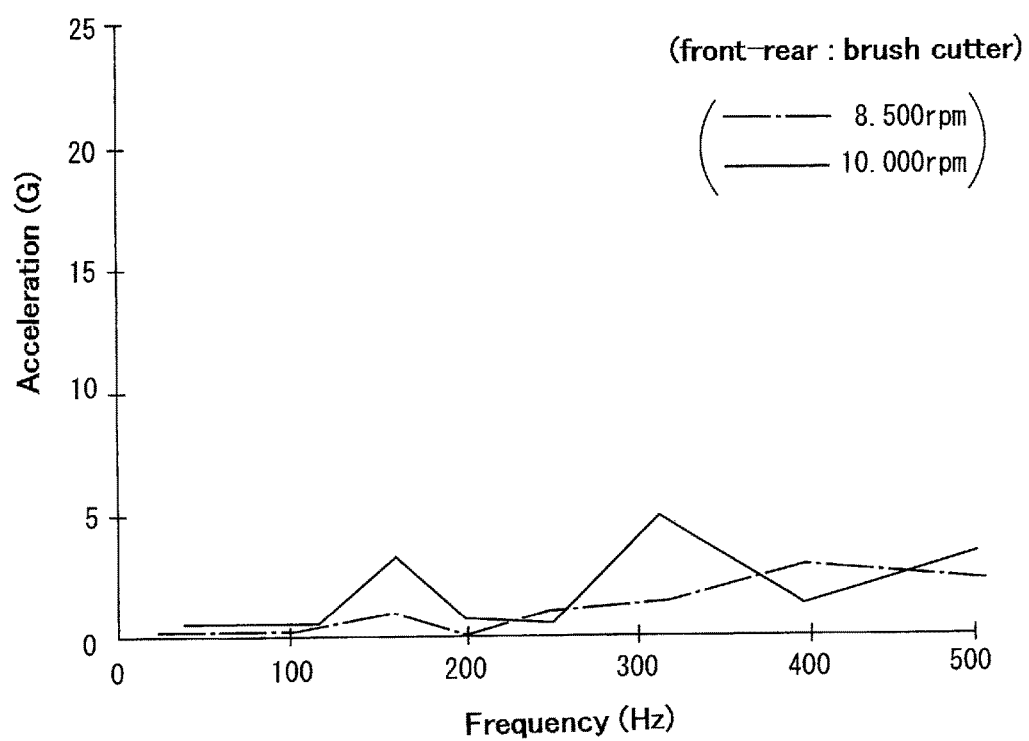
FIG. 2 shows data of front-and-rear vibration detected on the drive unit of the brush cutter driven by the internal combustion engine.

Furthermore, let it be remarked again that the acceleration sensor unit 24 is mounted in the brush cutter 100 in the orientation with its detection axis DA extending aslant from the up-and-down direction. Therefore, as far as the up-and-down vibration of the drive unit 4 is concerned, which is the engine vibration inherent to the operation of the engine 14 of the brush cutter 100 as already explained with reference to FIG. 1, the sensitivity the acceleration unit 24 originally has may be decreased to minimize undesirable activation of the safety device by detection of engine vibration that is not an index of danger.

Figure 3:
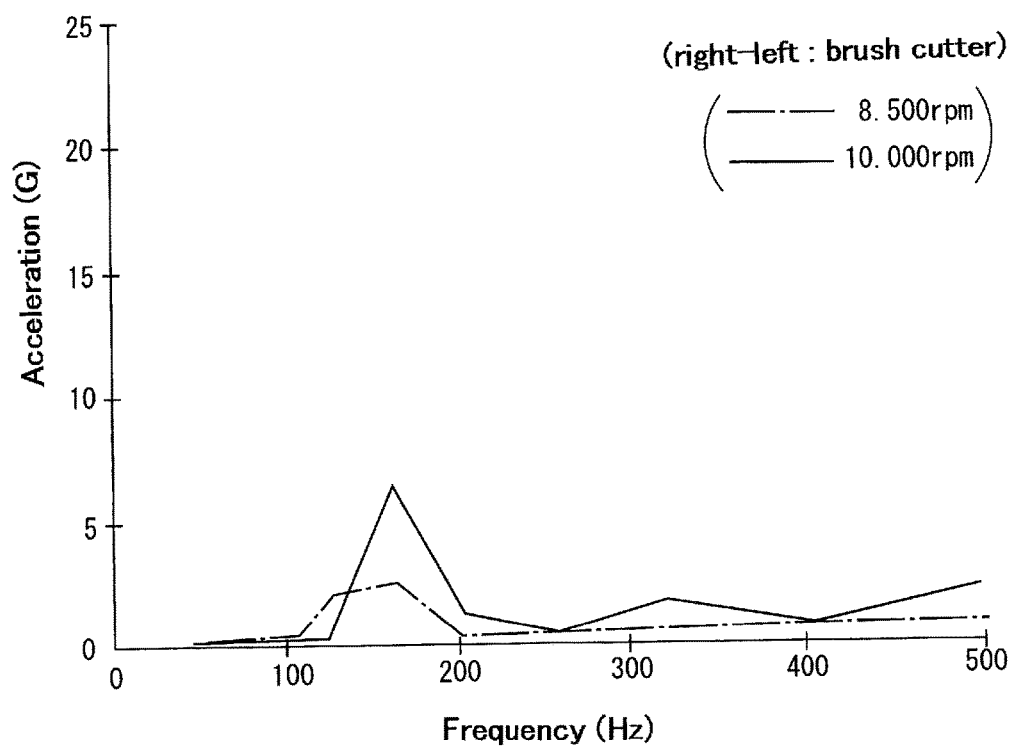
FIG. 3 shows data of right-and-left vibration detected on the drive unit of the brush cutter driven by the internal combustion engine.
Figure 4:
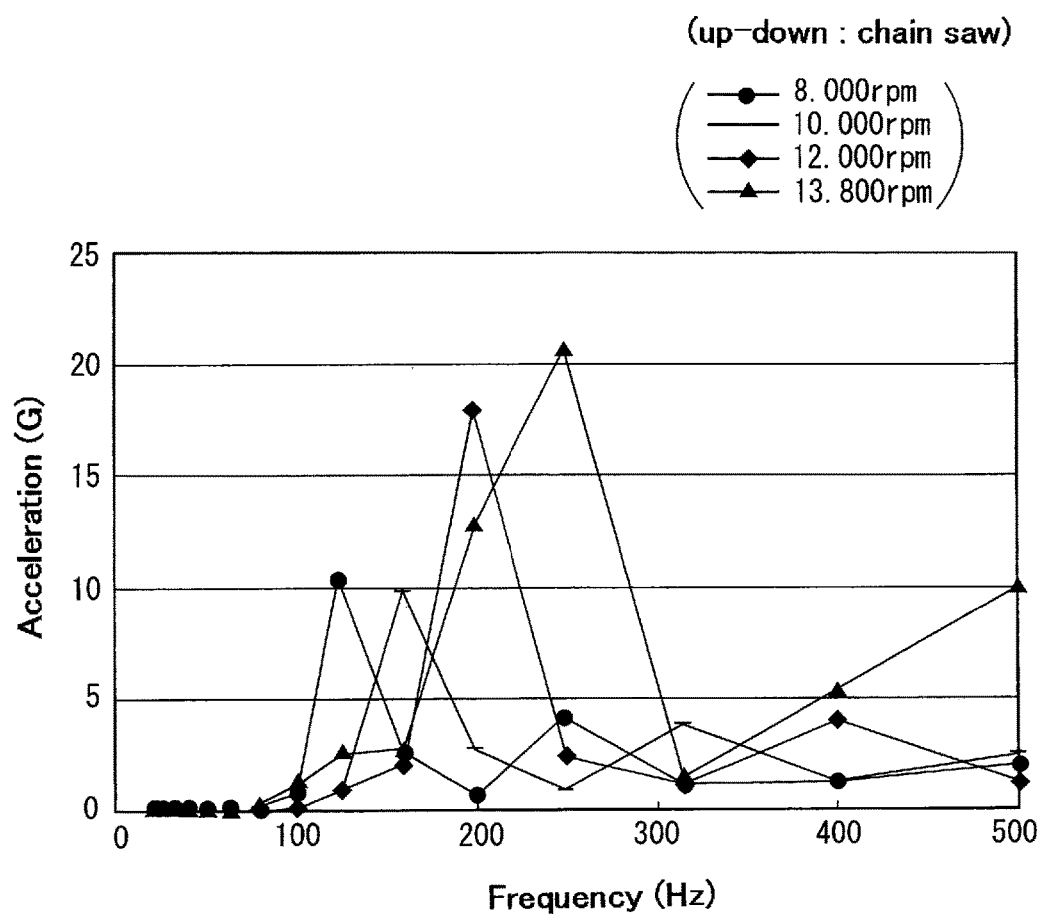
FIG. 4 shows up-and-down vibration detected on the drive unit of a chain saw driven by an internal combustion engine.
Figure 5:
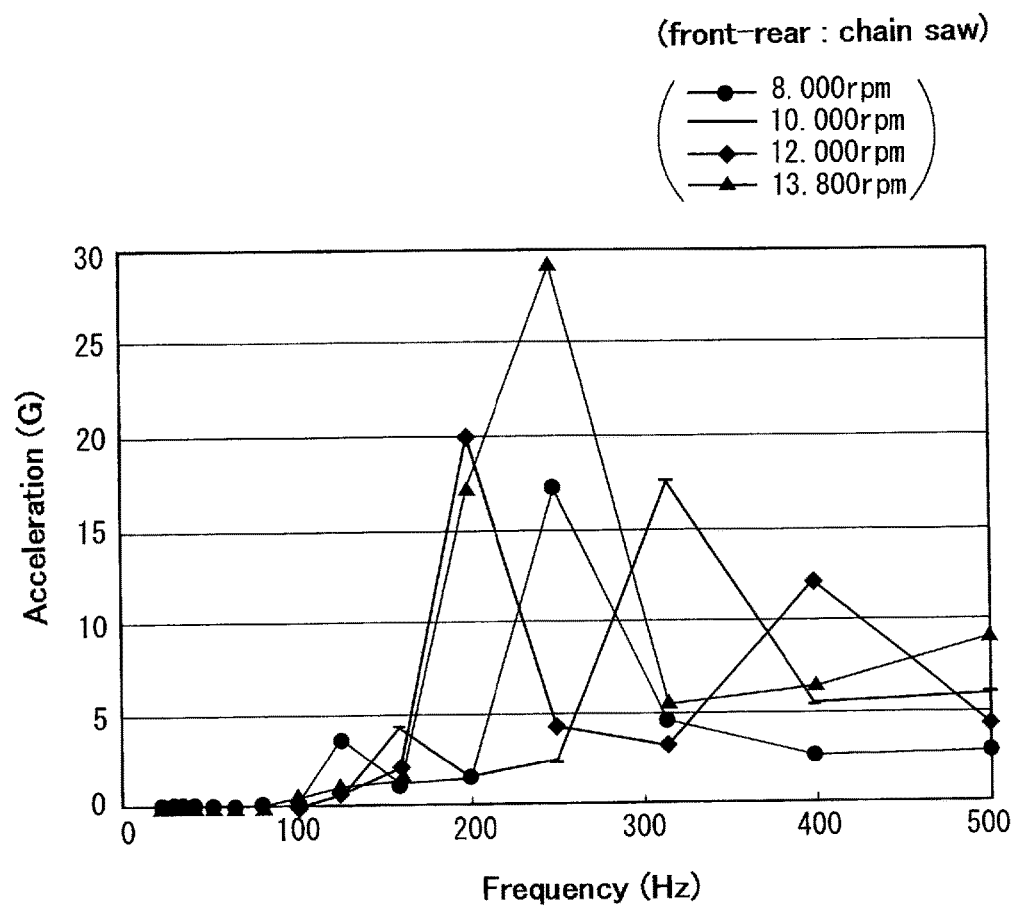
FIG. 5 shows front-and-rear vibration detected on the drive unit of the chain saw driven by the internal combustion engine.

As already explained, it is possible to offer a lineup of some acceleration sensor units 24 having different sensitivities. Therefore, distributors can choose one of them having the most suitable sensitivity for each user of the brush cutter 100 to deliver a brush cutter 100 equipped with the safety device 42 best tuned for his/her work environment or vibration characteristics of the engine used in the brush cutter. The user who brought back home the brush cutter 100 can tune the sensitivity by resetting the acceleration sensor unit more upright relative to the up-and-down direction V up to, for example, the second slanting position shown by the imaginary line in FIG. 3 to his/her satisfaction if he/she prefers that the safety device is less sensitive to engine vibration after using the brush cutter in actual operation.

Upon receipt of a momentary shock, the acceleration sensor unit 24 keeps a detected maximum acceleration for 5 seconds, for example. Then, if the maximum acceleration is larger than the threshold, the acceleration sensor unit 24 supplies the shock detection signal for a predetermined time (5 seconds, for example). After that, however, since the shock detection signal turns OFF (output of the safety signal from the controller 26 turns OFF), the worker can start his work again, if he/she wants to do so, by simply manipulating the recoil starter 20 and thereby starting the engine without any other manipulation even though the engine 14 is once stopped forcibly by activation of the safety device 42 (output of the safety signal from the controller 26).

Figure 16:
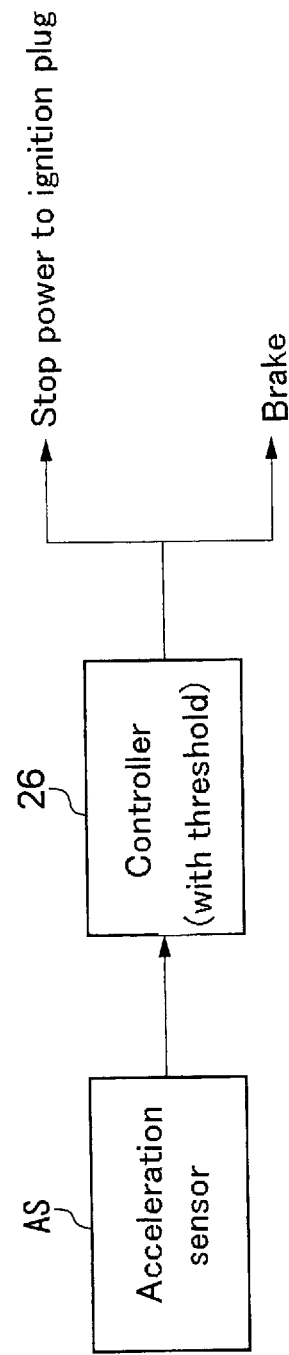
FIG. 16 is a block diagram of a safety device using an acceleration sensor and an object to be controlled by the safety device.

The safety device 42 of the brush cutter 100 has been explained above as incorporating the acceleration sensor (piezoelectric sensor) as its component. The safety device 42, however, need not always use such a combined-type sensor unit 24. As shown in FIG. 12, a solo-type acceleration sensor AS may be directly attached to the drive unit 4 in an orientation with its detection axis extending aslant from the up-and-down direction V. By entering an output of the acceleration sensor AS to the controller 26 (FIG. 16) and comparing it with a preset threshold in the controller 26, if a detected acceleration is higher than the threshold, a safety signal may be supplied from the controller to the high voltage generating circuit 30 to interrupt generation of the high voltage. The controller 26 may have the function of a timer to continue outputting the safety signal for a predetermined time. A plurality of different threshold values may be stored in a memory of the safety device 42 such that distributors or users can select and set an optimum value suitable for a particular expected work environment.

The brush cutter 100 according to the above-explained embodiment can protect the worker against any sudden danger because the acceleration sensor unit 24 attached to the drive unit 4 stops the engine when detecting a shock larger than a predetermined value. In relation to whichever component of the brush cutter will be suitable as the target to be controlled by a disabling means, i.e. safety device, for stopping the rotation of the cutting blade 40, a brake mechanism may be provided to stop the rotation of the cutting blade 40 instead of, or in addition to, forcibly stopping the engine.

Figure 17:
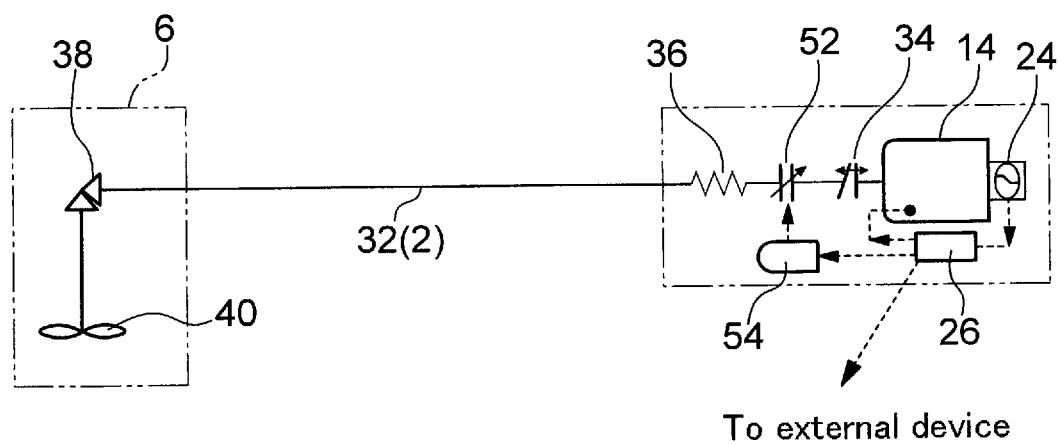
FIG. 17 shows an example, which includes, as a subject for control by the safety device, braking of an output of a centrifugal clutch in addition to engine stop.

FIG. 17 shows an example in which, in addition to the configuration for non-firing the ignition plug, a brake 52 having an actuator 54 is provided between the centrifugal clutch 34 and the damper 36 to forcibly stop the output part of the centrifugal clutch 34 by applying a safety signal to the actuator 54 of the brake 52. This example of FIG. 17 employs the configuration in which the supply of the high voltage to the ignition plug 18 is stopped to thereby stop the engine by interrupting generation of the high voltage in the high voltage generating circuit 30, and additionally, a braking force is applied to the output part of the centrifugal clutch 34 as explained above. However, the control for stopping the engine may be omitted. It is also noted that the example of FIG. 17 is configured to supply a safety signal generated by the controller 26 to an external device. The external device may be a communication means, for example, which will receive the safety signal from the controller 26 and send an alarm to a work or business management company employing or managing the worker or a mobile phone of the worker's family.

Figure 18:
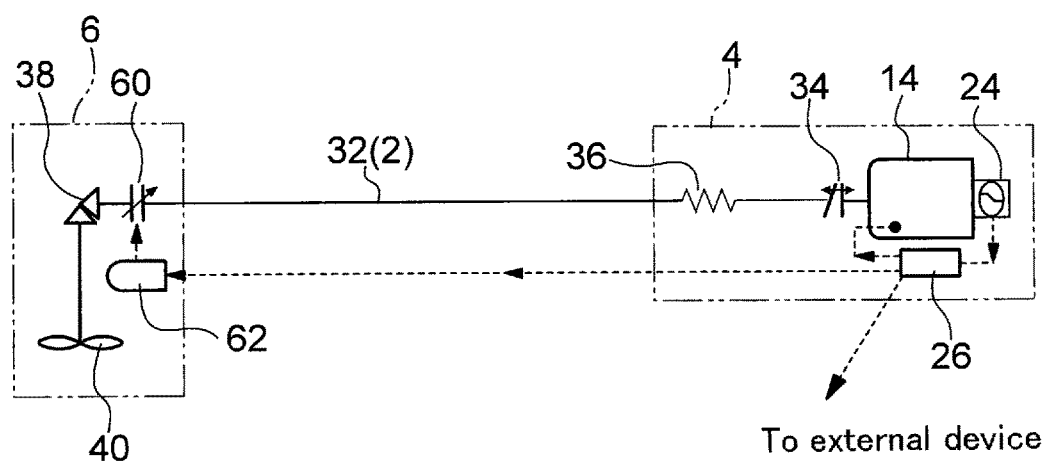
FIG. 18 shows an example which includes, as a subject for control by the safety device, braking an input to a bevel gear of the cutter unit in addition to engine stop.

FIG. 18 shows another example of the target to be controlled. The example of FIG. 18 uses a brake 60 provided just upstream of the bevel gear 38 in the cutter unit 6. The safety signal from the controller 26 is supplied to an actuator 62 of the brake 60 to apply a braking force to a portion immediately upstream of the bevel gear 38. Since the cutting blade 40 is located immediately downstream of the bevel gear 38, the cutting blade 40 can be forcibly stopped from rotating in a direct manner. In a variant of the embodiment shown in FIG. 18, a brake may be provided as a disabling means at the end of the manipulation tube 2 to apply a braking force to the end portion of the power transmission shaft 32, for thereby stopping the cutting blade 40 directly from rotating.

The acceleration sensor unit 24 or acceleration sensor AS may be attached in any appropriate location of the drive unit 4 such as on the inner surface of the engine cover 12 or in a dead space of the drive unit 4.

Heretofore, some embodiments and modifications have been explained with reference to the accompanying drawings. The safety device 42 including the acceleration sensor unit 24 or acceleration sensor AS is applicable to other types of work apparatuses using an internal combustion engine as a drive source. Examples of such work apparatuses include chain saws and hedge trimmers. By using the present invention in these work apparatuses having a cutting blade and reducing influence of engine vibration, it is possible, even with a relatively small threshold value, to reliably find out undesirable conditions likely to invite a danger and to thereby perform reliable safety control to inactivate the engine and the cutting blade.

Figure 19:
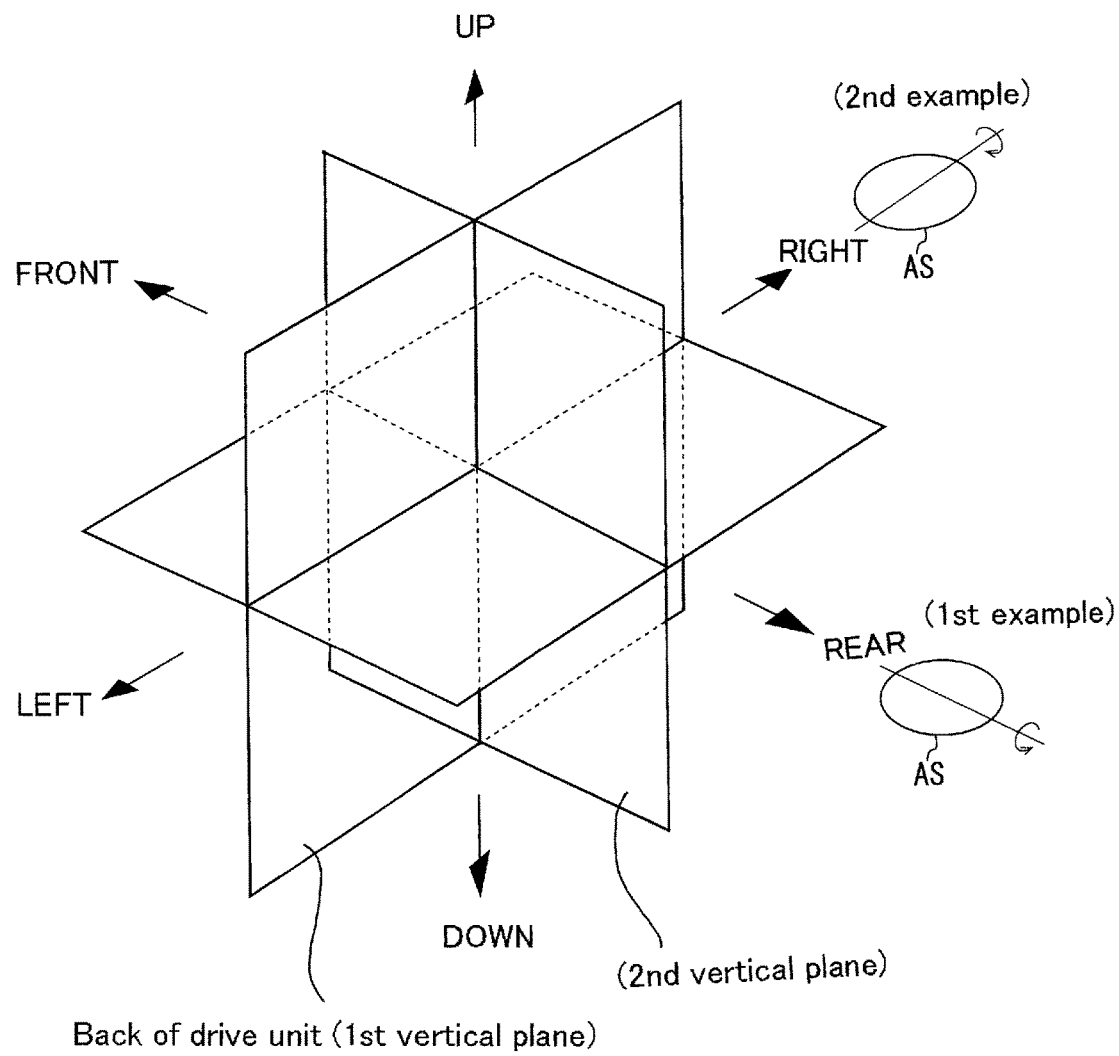
FIG. 19 is a diagram for explaining the degree of freedom in changing the orientation of a shock pickup face of the acceleration sensor when the detection axis of the acceleration sensor should be inclined relative to the up-and-down direction.

An axis of the acceleration sensor AS normal to its shock pickup face is the detection axis DA. Therefore, certain freedom is allowed for orientation of the shock pickup face of the acceleration sensor AS when the detection axis DA is set aslant from the up-and-down direction. FIG. 19 is a diagram for explaining the degree of freedom allowed for orientation of the pickup surface of the acceleration sensor AS when the detection axis DA of the acceleration sensor AS is disposed obliquely relative to the up-and-down direction. Among the terms "right", "left", "front", "rear", "up" and "down" used in FIG. 14, the terms "right" and "left" are used to specify the direction in which the cutting blade 40 is moved reciprocally by the worker in cutting operation with the brush cutter 100. The terms "front" and "rear" are used to show the direction approximately along the extending direction of the manipulation tube 2. In case the brush cutter 100 has a single-cylinder internal combustion engine 14, the terms "up" and "down" specify the axial direction of the cylinder bore of the internal combustion engine 14.

The detection axis DA of the acceleration sensor AS can be set aslant from the up-and-down direction by placing the acceleration sensor AS to lay its shock pickup face on a horizontal plane and then turning the acceleration sensor about its own front-to-rear axis. In this first example, the acceleration sensor AS can detect up-and-down acceleration and right-and-left acceleration. Alternatively, the detection axis DA of the acceleration sensor AS can be set aslant from the up-and-down direction by placing the acceleration sensor AS to lay its shock pickup face on a horizontal plane and then rotating the acceleration sensor AS about its own right-to-left axis. In this second example, the acceleration sensor AS can detect up-and-down acceleration and front-and-rear acceleration. In case the first and second examples are combined, the acceleration sensor AS can detect acceleration of three directions, namely, right-and-left, front-and-rear and up-and-down directions. The first and second examples are typical ways of "inclining the detection axis DA from the up-and-down direction" according to the present invention.

Figure 6:
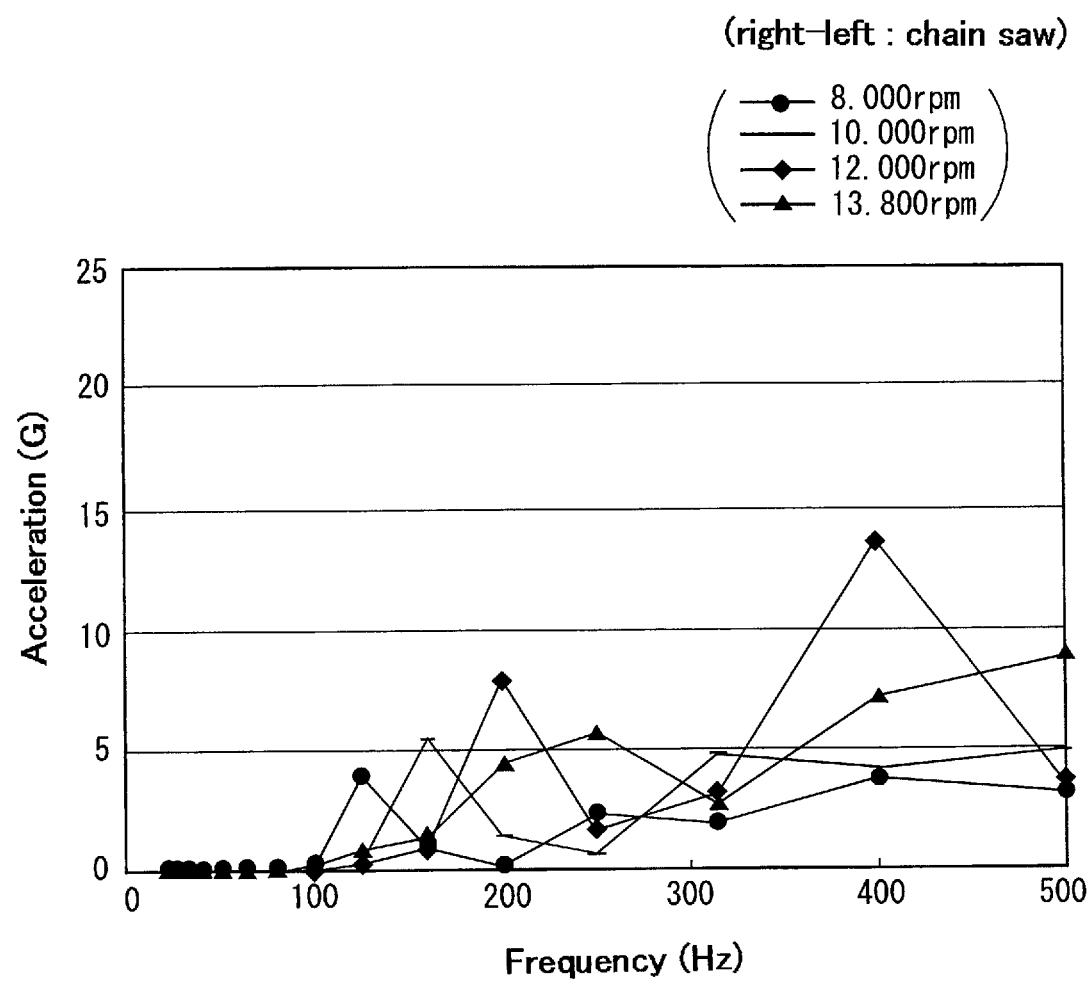
FIG. 6 shows right-and-left vibration detected on the drive unit of the chain saw driven by the internal combustion engine.
Figure 7:
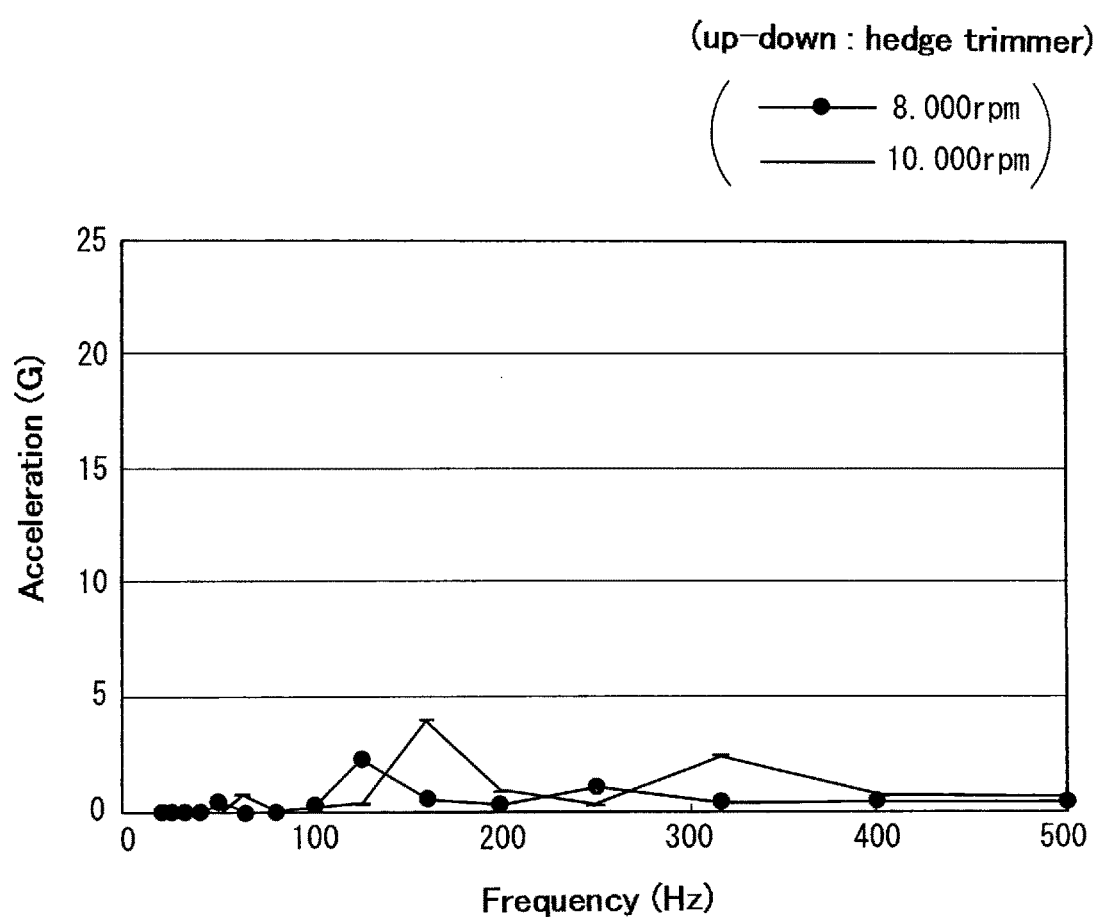
FIG. 7 shows up-and-down vibration detected on the drive unit of a hedge trimmer driven by an internal combustion engine.
Figure 8:
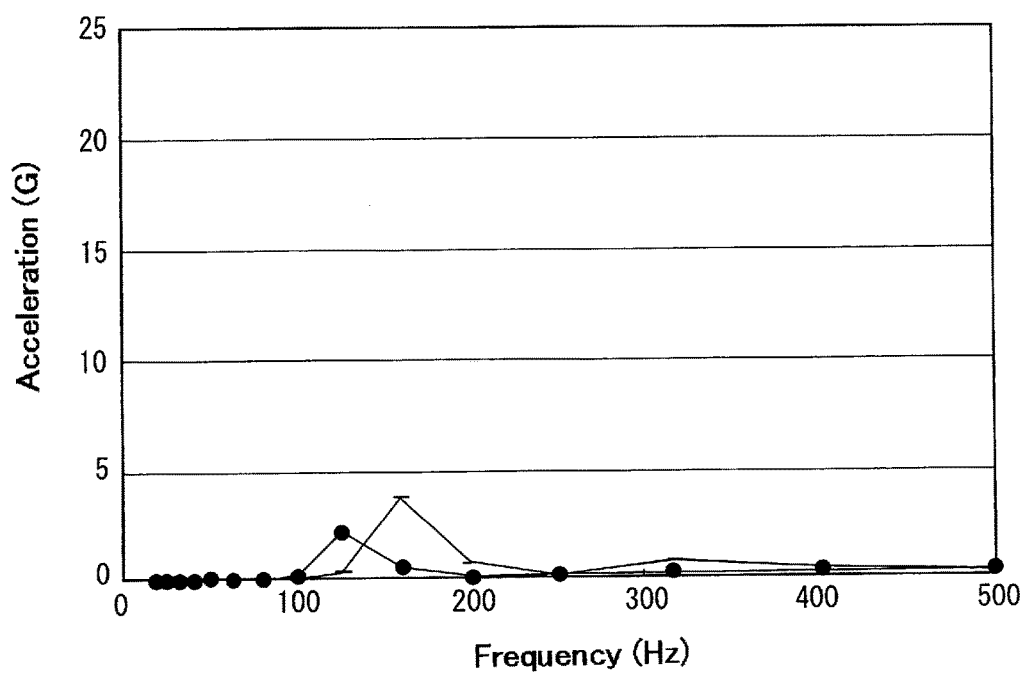
FIG. 8 shows front-and-rear vibration detected on the drive unit of the hedge trimmer driven by the internal combustion engine.
Figure 9:
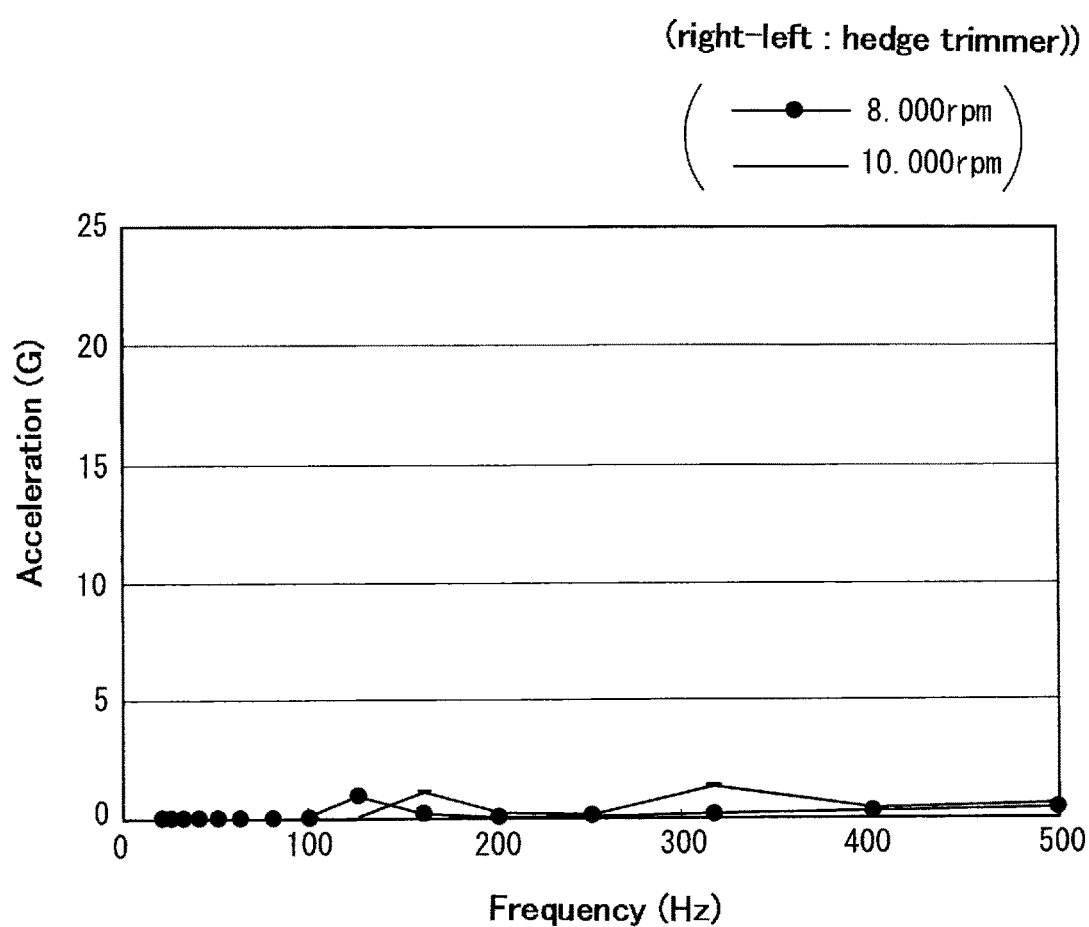
FIG. 9 shows right-and-left vibration detected on the drive unit of the hedge trimmer driven by the internal combustion engine.

In FIG. 6 (chain saw: front-and-rear vibration), relatively large acceleration is observed in the front-and-rear vibration as well. If influence of front-and-rear vibration should be suppressed in addition to influence of the engine vibration, in case of a chain saw, the first example of FIG. 19, rather than the second example, may be employed, which inclines the detection axis DA from the up-and-down direction by rotating the acceleration sensor AS about its own front-to-rear axis.

In any of the first and second examples, the user at work with the brush cutter 100 carries it to have the cutting blade 40 extended to a front down position as viewed from the worker. Therefore, even if the acceleration AS has been set like the first example, for instance, relative to the back face of the drive unit 4 (first vertical plane), it becomes, in the actual work environment, equivalent to positioning the shock pickup face of the acceleration sensor AS aslant of all of the three dimensional planes. Thus, the acceleration sensor AS can detect acceleration in any of front-and-rear, right-and-left and up-and-down directions. This is applicable to chain saws and hedge trimmers as well.

The drive unit 4 is relatively heavy. Probably, therefore, when the work apparatus drops, the drive unit 4 will first hit the ground. In addition, the drive unit 4 is remote from the cutting blade 40 into which a kickback enters. Therefore, it is advantageous to position the acceleration sensor unit 24 or acceleration sensor AS in the drive unit 4 to enter the shock received by the cutting blade 40 after amplifying it with the entire length of the brush cutter 100. In addition to this advantage, locating the acceleration sensor unit 24 or acceleration sensor AS in the drive unit 4 has the advantage that the wiring for electrically connecting the controller 26, high voltage generating circuit, etc. may be short.

What is claimed is:

1. A work apparatus including an internal combustion engine in a drive unit, and including a cutting blade driven at a high speed by a drive force transmitted from the internal combustion engine, said working apparatus further including a safety device for protecting a worker from said cutting blade upon occurrence of an unexpected danger while the worker works with the cutting blade driven at said high speed, said safety device comprising:
    an acceleration sensor attached to said drive unit for movement therewith, said acceleration sensor for detecting a shock that occurs along a detection axis; and
    a controller supplied with an output from said acceleration sensor to output a safety signal for affecting operation of the internal combustion engine when the acceleration detected by the acceleration sensor is higher than a threshold,
    wherein said acceleration sensor is disposed such that an orientation of said detection axis inclines with respect to an axial line of a cylinder bore of said internal combustion engine, and
    wherein the acceleration sensor is adjustable in orientation relative to the cylinder bore to adjust an angle of inclination of said detection axis relative to the axial line of said cylinder bore.

2. The work apparatus according to claim 1 wherein said work apparatus is one of a brush cutter, chain saw and hedge trimmer.

3. The work apparatus according to claim 1 wherein said acceleration sensor is of a single-axis configuration.

4. The work apparatus according to claim 1 wherein said affecting operation of the internal combustion engine comprises stopping operation of the internal combustion engine.

* * * * *